(12) United States Patent
Lu et al.

(10) Patent No.: US 10,460,029 B2
(45) Date of Patent: Oct. 29, 2019

(54) REPLY INFORMATION RECOMMENDATION METHOD AND APPARATUS

(71) Applicant: Huawei Technologies Co., Ltd., Shenzhen, Guangdong (CN)

(72) Inventors: Zhengdong Lu, Shenzhen (CN); Yibo Zhang, Shenzhen (CN); Hang Li, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 15/357,648

(22) Filed: Nov. 21, 2016

(65) Prior Publication Data

US 2017/0124064 A1 May 4, 2017

Related U.S. Application Data

(63) Continuation of application No. PCT/CN2014/092382, filed on Nov. 27, 2014.

(30) Foreign Application Priority Data

May 22, 2014 (CN) .......................... 2014 1 0217040

(51) Int. Cl.
*G06F 17/27* (2006.01)
*G06F 16/2458* (2019.01)
(Continued)

(52) U.S. Cl.
CPC ............ *G06F 17/274* (2013.01); *G06F 16/00* (2019.01); *G06F 16/2468* (2019.01);
(Continued)

(58) Field of Classification Search
CPC ......... G06F 17/30654; G06F 17/30675; G06F 17/30684; G06F 3/0237; G06F 17/276;
(Continued)

(56) References Cited

U.S. PATENT DOCUMENTS 8,996,639 B1 * 3/2015 Faaborg .................. H04L 51/02
455/412.1
9,342,626 B1 * 5/2016 Das ...................... G06F 17/3097
(Continued)

FOREIGN PATENT DOCUMENTS

CN 101287172 A 10/2008
CN 102289431 A 12/2011
(Continued)

*Primary Examiner* — Richemond Dorvil
*Assistant Examiner* — Mark Villena
(74) *Attorney, Agent, or Firm* — Fish & Richardson P.C.

(57) ABSTRACT

A reply information recommendation method and apparatus provides recommended reply information suitable for a context that can be quickly and accurately calculated when a user replies to information. A specific solution is: acquiring information to be replied to received by a user and pre-reply information that is input by the user and corresponding to the information to be replied to; performing segmentation processing on the information to be replied to, to obtain a segmentation processing result; learning a stored text interaction history set of the user to obtain a reply model; obtaining candidate reply information with reference to the segmentation processing result of the information to be replied to and the reply model; and calculating a set of recommended reply information with reference to the candidate reply information and the pre-reply information. The embodiments of present invention are used for reply information recommendation.

18 Claims, 6 Drawing Sheets

(51) Int. Cl.
*G06F 17/22* (2006.01)
*G06F 17/24* (2006.01)
*G06F 17/28* (2006.01)
*G06Q 10/10* (2012.01)
*G06F 16/00* (2019.01)

(52) U.S. Cl.
CPC ........ *G06F 17/2229* (2013.01); *G06F 17/248* (2013.01); *G06F 17/2705* (2013.01); *G06F 17/2785* (2013.01); *G06F 17/2818* (2013.01); *G06Q 10/107* (2013.01)

(58) Field of Classification Search
CPC .... G06F 17/277; G06F 17/2775; G06F 17/28; G06F 17/3097; G06F 17/30976; G10L 15/1822
See application file for complete search history.

(56) References Cited

U.S. PATENT DOCUMENTS

| | | |
|---|---|---|
| 2002/0187794 A1 | 12/2002 | Fostick et al. |
| 2006/0080107 A1* | 4/2006 | Hill ..................... G10L 15/1822 704/275 |
| 2006/0206477 A1* | 9/2006 | Dalvi ................ G06F 17/30542 |
| 2007/0201634 A1 | 8/2007 | Bonnaud et al. |
| 2008/0189605 A1* | 8/2008 | Kay ....................... G06F 3/0237 715/257 |
| 2009/0077185 A1 | 3/2009 | Chiu et al. |
| 2009/0221367 A1* | 9/2009 | Longley .............. G07F 17/3276 463/32 |
| 2009/0287678 A1* | 11/2009 | Brown .............. G06F 17/30654 |
| 2010/0225599 A1* | 9/2010 | Danielsson ........... G06F 3/0237 345/173 |
| 2010/0332215 A1 | 12/2010 | Alhonen |
| 2011/0019712 A1 | 1/2011 | Geib |
| 2011/0078192 A1* | 3/2011 | Murdock, IV .... G06F 17/30654 707/780 |
| 2012/0078873 A1* | 3/2012 | Ferrucci ................... G06N 5/02 707/708 |
| 2012/0078902 A1* | 3/2012 | Duboue ............ G06F 17/30675 707/736 |
| 2012/0083287 A1 | 4/2012 | Casto et al. |
| 2012/0185239 A1* | 7/2012 | Goud ................ G06F 17/2735 704/10 |
| 2013/0246329 A1 | 9/2013 | Pasquero et al. |
| 2013/0282363 A1* | 10/2013 | Fan ..................... G06F 17/2872 704/9 |
| 2014/0052716 A1* | 2/2014 | Chakra ............. G06F 17/30864 707/723 |
| 2014/0214405 A1* | 7/2014 | Ouyang ................ G06F 3/0237 704/9 |
| 2014/0278349 A1* | 9/2014 | Grieves ............... G06F 17/2735 704/8 |
| 2014/0278910 A1* | 9/2014 | Visintainer ........ G06Q 30/0242 705/14.41 |
| 2014/0310306 A1* | 10/2014 | Sawczuk ........... G06F 17/30684 707/769 |
| 2015/0302301 A1* | 10/2015 | Petersen ................... G06N 5/04 706/11 |
| 2016/0004687 A1* | 1/2016 | Kurian ................ G06F 17/2735 704/10 |

FOREIGN PATENT DOCUMENTS

| | | |
|---|---|---|
| CN | 103390047 A | 11/2013 |
| CN | 103686723 A | 3/2014 |
| EP | 1672896 A1 | 6/2006 |
| WO | 2012156686 A1 | 11/2012 |
| WO | 2013110955 A1 | 8/2013 |

* cited by examiner

Radical

1. I have many things to do these days. Maybe next time
2. Sorry, I suffer from excessive internal heat these days
I have something to do tonight, so I cannot go with you. Have fun Moderate 1. I have to beg off. Maybe next time
2. I have to beg off, because I have something to do tonight
3. I have to work overtime today, so I have to beg off
4. I have something to do tonight, so I have to beg off Conservative 1. I beg off
2. I have to beg off

FIG. 3

REPLY INFORMATION RECOMMENDATION METHOD AND APPARATUS

CROSS-REFERENCE TO RELATED APPLICATIONS

This application is a continuation of International Application No. PCT/CN2014/092382, filed on Nov. 27, 2014, which claims priority to Chinese Patent Application No. 201410217040.1, filed on May 22, 2014. The disclosures of the aforementioned applications are hereby incorporated by reference in their entireties.

TECHNICAL FIELD

The present invention relates to the database field, and in particular, to a reply information recommendation method and apparatus.

BACKGROUND

With the development of mobile Internet, a growing number of users access the Internet by using intelligent terminal devices. The development of mobile Internet applications represented by a social networking service and instant messaging brings about an input requirement that is much higher than a traditional one.

Currently, a technical method such as a preset information template technology, a word association input technology, a word input recommendation and correction technology based on an individual language model (Individual Language Model), or improvement in convenience of an editing function by means of UI (User Interface) design is generally used.

For the preset information template technology, a common characteristic of such a technology is as follows: word segmentation and classification processing are performed on to-be-replied content, and then reply content is recommended according to a set rule mode. A specific implementation solution may be based on a terminal, based on a network side service, or based on a terminal and a network. In such a solution, recommendation is performed only according to matching with a keyword and a given rule, which causes relatively low accuracy of a model.

For the word association input technology, a characteristic of such a technology is as follows: a character, a word, a phrase, or a sentence is rearranged according to frequency of use to form a lexicon, keyboard input of a user is used as a search condition, and multiple preferred options are found from the lexicon for the user to select; in some technologies, most recent input (for example, a previous character or word) is also included into the search condition; and such a solution also provides a fault tolerance feature to some extent. However, a linguistic characteristic of the user cannot be reflected, and only a word group and a phrase can be associated, so that improvement in input convenience is limited.

For an input technology based on an individual language model, in such a technology, an individual language model of a user is trained based on a historical input record of the user, and input of the user is forecasted and corrected based on the foregoing individual language model by using the Bayesian method. In such a method, a forecast and a correction are performed by using input of a user, but recommended reply information suitable for a context cannot be provided.

Currently, in some fuzzy matching technologies used by a search engine, possible search content is forecasted and recommended according to user input, and a user input interface is improved by using human-computer interaction techniques. Similar to an existing input method technology based on an individual language model, these technologies can improve input convenience for a user to some extent, but none of them can provide recommended reply information suitable for a context.

With transition of terminal use from simple address book query and short message input to complex scenarios such as instant messaging, social interaction, and even blog writing, the foregoing technologies become increasingly difficult to quickly and accurately provide recommended reply information suitable for a context when a user replies to information.

SUMMARY

Embodiments of the present invention provide a reply information recommendation method and apparatus; according to the method and the apparatus, recommended reply information suitable for a context can be quickly and accurately calculated when a user replies to information.

To achieve the foregoing objective, the following technical solutions are used in the embodiments of the present invention:

According to a first aspect, a reply information recommendation method is provided, where the method includes:

acquiring information to be replied to received by a user and pre-reply information that is input by the user and corresponding to the information to be replied to;

performing segmentation processing on the information to be replied to, to obtain a segmentation processing result;

learning a stored text interaction history set of the user to obtain a reply model, where the text interaction history set includes at least one piece of historical information to be replied to that is historically received by the user and reply information corresponding to the at least one piece of historical information to be replied to, and the reply model includes at least one set of a correspondence between historical information to be replied to and reply information;

obtaining candidate reply information with reference to the segmentation processing result of the information to be replied to and the reply model; and calculating a set of recommended reply information with reference to the candidate reply information and the pre-reply information.

With reference to the first aspect, in a first possible implementation manner, the performing segmentation processing on the information to be replied to, to obtain a segmentation processing result includes:

performing, according to a level of a character, a word, a phrase, or a sentence, segmentation on the information to be replied to, to obtain the segmentation processing result.

With reference to the first aspect or the first possible implementation manner, in a second possible implementation manner, the calculating a set of recommended reply information with reference to the candidate reply information and the pre-reply information includes:

generating, according to the candidate reply information, a multi-grammar information set for the information to be replied to, where the multi-grammar information set includes at least one piece of candidate reply information corresponding to the information to be replied to, and a priority of each piece of candidate reply information in the at least one piece of candidate reply information in being used as recommended reply information;

combining the pre-reply information and the multi-grammar information set to generate at least one piece of first recommended reply information;

performing semantic matching between the pre-reply information and the candidate reply information to generate at least one piece of second recommended reply information;

performing fuzzy string matching between the pre-reply information and the candidate reply information to generate at least one piece of third recommended reply information;

calculating a conditional probability model according to the multi-grammar information set, where the conditional probability model includes the at least one piece of candidate reply information and use frequency of each piece of candidate reply information in the at least one piece of candidate reply information; and performing, according to the conditional probability model, comprehensive ranking for the first recommended reply information, the second recommended reply information, and the third recommended reply information, to obtain the set of recommended reply information, where the set of recommended reply information includes recommended reply information in at least one expression manner, so that the user selects and uses the recommended reply information to reply to the information to be replied to.

With reference to the first aspect and the second possible implementation manner, in a third possible implementation manner, the calculating a conditional probability model according to the multi-grammar information set, where the conditional probability model includes the at least one piece of candidate reply information and use frequency of each piece of candidate reply information in the at least one piece of candidate reply information includes:

calculating the conditional probability model according to the multi-grammar information set and a stored individual language model of the user, where the individual language model includes a statistical result of reply information that is historically sent by the user.

With reference to the first aspect and the second or third possible implementation manner, in a fourth possible implementation manner, the first recommended reply information includes at least one of the following: a recommended character and a recommended word.

With reference to the first aspect and any one of the second to fourth possible implementation manners, in a fifth possible implementation manner, the second recommended reply information includes at least one of the following: a recommended phrase and a recommended sentence.

With reference to the first aspect and any one of the second to fifth possible implementation manners, in a sixth possible implementation manner, the third recommended reply information includes at least one of the following: the recommended phrase and the recommended sentence.

With reference to the first aspect and any one of the first to sixth possible implementation manners, in a seventh possible implementation manner, the candidate reply information includes at least one of the following: a candidate character, a candidate word, a candidate phrase, and a candidate sentence.

With reference to the first aspect and any one of the first to seventh possible implementation manners, in an eighth possible implementation manner, the recommended reply information includes at least one of the following: the recommended character, the recommended word, the recommended phrase, and the recommended sentence.

According to a second aspect, a reply information recommendation apparatus is provided, where the apparatus includes:

an acquiring unit, configured to acquire information to be replied to received by a user and pre-reply information that is input by the user and corresponding to the information to be replied to;

a segmenting unit, configured to perform segmentation processing on the information to be replied to acquired by the acquiring unit, to obtain a segmentation processing result;

a learning unit, configured to learn a stored text interaction history set of the user to obtain a reply model, where the text interaction history set includes at least one piece of historical information to be replied to that is historically received by the user and reply information corresponding to the at least one piece of historical information to be replied to, and the reply model includes at least one set of a correspondence between historical information to be replied to and reply information;

a candidates unit, configured to obtain candidate reply information with reference to the segmentation processing result that is of the information to be replied to and obtained by the segmenting unit and the reply model obtained by the learning unit; and a recommending unit, configured to calculate a set of recommended reply information with reference to the candidate reply information obtained by the candidates unit and the pre-reply information acquired by the acquiring unit.

With reference to the second aspect, in a first possible implementation manner, the segmenting unit is specifically configured to perform, according to a level of a character, a word, a phrase, or a sentence, segmentation on the information to be replied to, to obtain the segmentation processing result.

With reference to the second aspect and the first possible implementation manner, in a second possible implementation manner, the recommending unit includes:

a multi-grammar subunit, configured to generate, according to the candidate reply information obtained by the candidates unit, a multi-grammar information set for the information to be replied to, where the multi-grammar information set includes at least one piece of candidate reply information corresponding to the information to be replied to, and a priority of each piece of candidate reply information in the at least one piece of candidate reply information in being used as recommended reply information;

a word subunit, configured to generate at least one piece of first recommended reply information with reference to the pre-reply information acquired by the acquiring unit and the multi-grammar information set generated by the multi-grammar subunit;

a similarity matching subunit, configured to perform semantic similarity matching between the pre-reply information acquired by the acquiring unit and the candidate reply information obtained by the candidates unit, to generate at least one piece of second recommended reply information;

a fuzzy matching subunit, configured to perform fuzzy string matching between the pre-reply information acquired by the acquiring unit and the candidate reply information obtained by the candidates unit, to generate at least one piece of third recommended reply information;

a combining subunit, configured to calculate a conditional probability model according to the multi-grammar information set generated by the multi-grammar subunit, where the conditional probability model includes the at least one piece of candidate reply information and use frequency of each piece of candidate reply information in the at least one piece of candidate reply information; and a ranking subunit, configured to perform, according to the conditional probability model generated by the combining subunit, comprehensive ranking for the first recommended reply information generated by the word subunit, the second recommended reply information generated by the similarity matching subunit, and the third recommended reply information generated by the fuzzy matching subunit, to obtain the set of recommended reply information, where the set of recommended reply information includes recommended reply information in at least one expression manner, so that the user selects and uses the recommended reply information to reply to the information to be replied to.

With reference to the second aspect or the second possible implementation manner, in a third possible implementation manner, the combining subunit is specifically configured to: calculate the conditional probability model according to the multi-grammar information set generated by the multi-grammar subunit and a stored individual language model, where the individual language model includes a statistical result of reply information that is historically sent by the user.

With reference to the second aspect and the second or third possible implementation manner, in a fourth possible implementation manner, the first recommended reply information includes at least one of the following: a recommended character and a recommended word.

With reference to the second aspect and any one of the second to fourth possible implementation manners, in a fifth possible implementation manner, the second recommended reply information includes at least one of the following: a recommended phrase and a recommended sentence.

With reference to the second aspect and any one of the second to fifth possible implementation manners, in a sixth possible implementation manner, the third recommended reply information includes at least one of the following: a recommended phrase and the recommended sentence.

With reference to the second aspect or any one of the first to sixth possible implementation manners, in a seventh possible implementation manner, the candidate reply information includes at least one of the following: a candidate word, a candidate phrase, and a candidate sentence.

With reference to the second aspect or any one of the first to seventh possible implementation manners, in an eighth possible implementation manner, the recommended reply information includes at least one of the following: a recommended word, the recommended phrase, and the recommended sentence.

According to the reply information recommendation method and apparatus that are provided in the embodiments of the present invention, a stored text interaction history set of a user can be learned to obtain a reply model; information to be replied to and pre-reply information that has been input by the user are acquired and segmented; candidate reply information is obtained with reference to a segmentation processing result of the information to be replied to and the reply model; and a set of recommended reply information is calculated with reference to the candidate reply information, the pre-reply information, and a stored individual language model, so that recommended reply information suitable for a context is quickly and accurately calculated when the user replies to information.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 is a schematic diagram of implementation of a reply information recommendation method according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
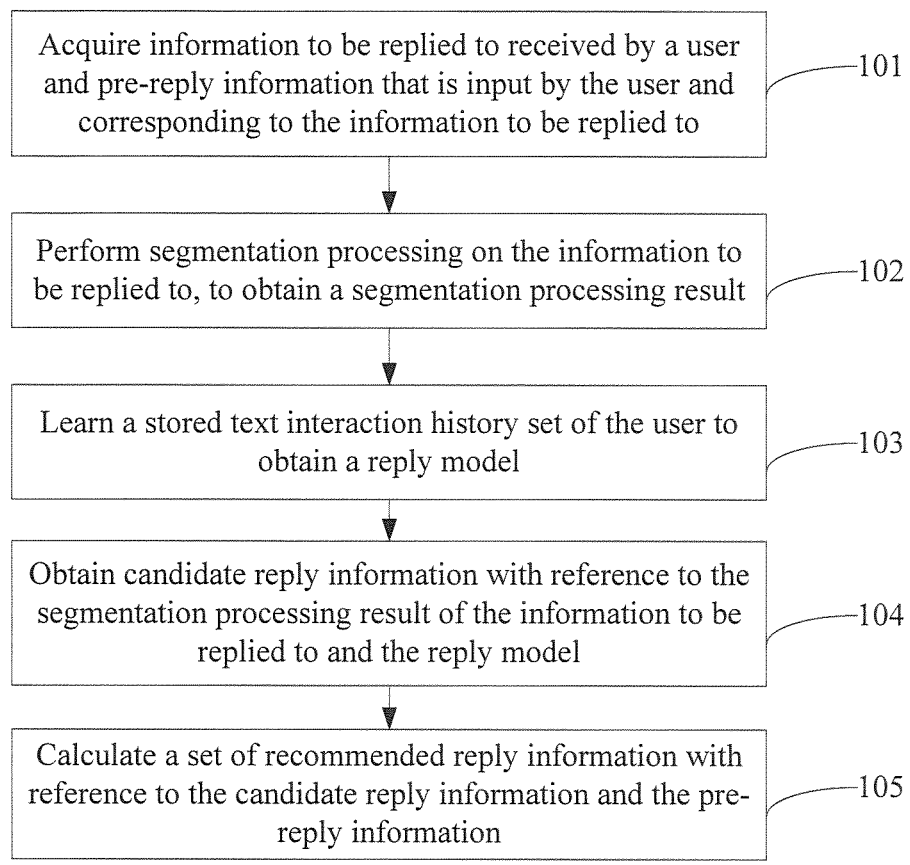
FIG. 1 is a schematic flowchart of a reply information recommendation method according to an embodiment of the present invention.

An embodiment of the present invention provides a reply information recommendation method. Referring to FIG. 1, the method includes the following steps:

101. Acquire information to be replied to received by a user and pre-reply information that is input by the user and corresponding to the information to be replied to.

It should be noted that, the pre-reply information may be any word, phrase, or sentence fragment that is input by the user; when the user does not perform any input operation, content of the pre-reply information may also be empty.

102. Perform segmentation processing on the information to be replied to, to obtain a segmentation processing result.

Specifically, the segmentation processing includes performing, according to a level of a character, a word, a phrase, or a sentence, segmentation on the information to be replied to, to obtain the segmentation processing result.

103. Learn a stored text interaction history set of the user to obtain a reply model.

Specifically, the text interaction history set includes a reply pair of source information and reply information, that is, the text interaction history set includes at least one piece of historical information to be replied to that is historically received by the user and reply information corresponding to the at least one piece of historical information to be replied to, and the reply model includes at least one set of a correspondence between historical information to be replied to and reply information. The reply model may be learned and concluded from the text interaction history set.

104. Obtain candidate reply information with reference to the segmentation processing result of the information to be replied to and the reply model.

Specifically, the segmentation processing result and various combinations of the segmentation processing result may be used as segmented information to be replied to, the segmented information to be replied to is associated with information to be replied to that is historically received by the user in the reply model, and reply information that is historically sent by the user and corresponding to the information to be replied to that is historically received by the user is selected as the candidate reply information. The candidate reply information includes at least one of the following: a candidate character, a candidate word, a candidate phrase, and a candidate sentence.

105. Calculate a set of recommended reply information with reference to the candidate reply information and the pre-reply information.

The set of recommended reply information may include recommended reply information in at least one expression manner, so that the user selects and uses the recommended reply information to reply to the information to be replied to.

Specifically, the recommended reply information may include at least one of the following: a recommended character, a recommended word, a recommended phrase, and a recommended sentence.

According to the reply information recommendation method provided in this embodiment of the present invention, a stored text interaction history set of a user can be learned to obtain a reply model; information to be replied to and pre-reply information that has been input by the user are acquired, and segmentation processing is performed on the information to be replied to; candidate reply information is obtained with reference to a segmentation processing result of the information to be replied to and the reply model; and a set of recommended reply information is calculated with reference to the candidate reply information and the pre-reply information, so that recommended reply information suitable for a context can be quickly and accurately calculated when the user replies to information.

Figure 2:
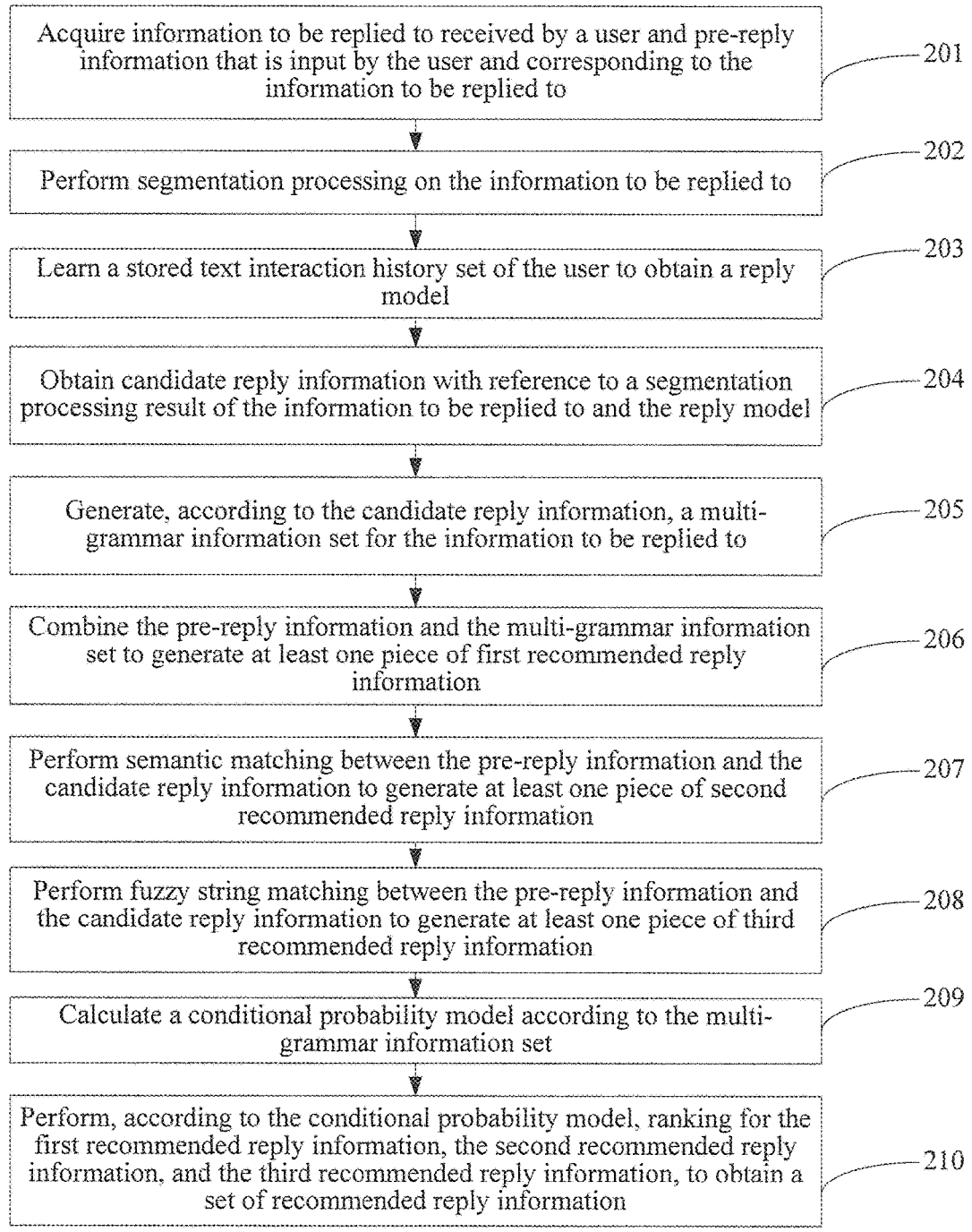
FIG. 2 is a schematic flowchart of a reply information recommendation method according to another embodiment of the present invention.

An embodiment of the present invention provides a reply information recommendation method. Referring to FIG. 2, the method includes the following steps:

201. Acquire information to be replied to received by a user and pre-reply information that is input by the user and corresponding to the information to be replied to.

202. Perform segmentation processing on the information to be replied to.

Specifically, the segmentation processing includes performing, according to a level of a character, a word, a phrase, or a sentence, segmentation on the information to be replied to, to obtain a segmentation processing result.

203. Learn a stored text interaction history set of the user to obtain a reply model.

Specifically, the text interaction history set includes a reply pair of source information and reply information, that is, the text interaction history set includes at least one piece of historical information to be replied to that is historically received by the user and reply information corresponding to the at least one piece of historical information to be replied to, and the reply model includes at least one set of a correspondence between historical information to be replied to and reply information. The reply model may be learned and concluded from the text interaction history set.

204. Obtain candidate reply information with reference to the segmentation processing result of the information to be replied to and the reply model.

Specifically, the segmentation processing result and various combinations of the segmentation processing result may be used as segmented information to be replied to, the segmented information to be replied to is associated with information to be replied to that is historically received by the user in the reply model, and reply information that is historically sent by the user and corresponding to the information to be replied to that is historically received by the user is selected as the candidate reply information. The candidate reply information includes at least one of the following: a candidate character, a candidate word, a candidate phrase, and a candidate sentence.

205. Generate, according to the candidate reply information, a multi-grammar information set for the information to be replied to.

The multi-grammar information set includes at least one piece of candidate reply information corresponding to the information to be replied to, and a priority of each piece of candidate reply information in the at least one piece of candidate reply information in being used as recommended reply information. The priority may be determined by an extent to which the candidate reply information and the information to be replied to are associated, and a higher extent indicates a higher priority. A specific characteristic that determines the priority is not limited herein.

206. Combine the pre-reply information and the multi-grammar information set to generate at least one piece of first recommended reply information.

Specifically, the pre-reply information is combined with the multi-grammar information set to generate the at least one piece of first recommended reply information, where the first recommended reply information includes at least one of the following: a recommended character and a recommended word.

207. Perform semantic matching between the pre-reply information and the candidate reply information to generate at least one piece of second recommended reply information.

Specifically, semantic matching is performed between the pre-reply information and the candidate sentence to generate the at least one piece of second recommended reply information, where the second recommended reply information includes at least one of the following: a recommended phrase and a recommended sentence.

208. Perform fuzzy string matching between the pre-reply information and the candidate reply information to generate at least one piece of third recommended reply information.

Specifically, fuzzy string matching is performed between the pre-reply information and the candidate sentence to generate the at least one piece of third recommended reply information, where the third recommended reply information includes at least one of the following: the recommended phrase and the recommended sentence.

Optionally, step 206, step 207, and step 208 are not performed in sequence.

209. Calculate a conditional probability model according to the multi-grammar information set.

Specifically, the conditional probability model may be calculated according to the multi-grammar information set and a stored individual language model.

The individual language model includes a statistical result of reply information that is historically sent by the user, may include a statistical result of a linguistic habit in the reply information sent by the user, and may also include other information, which is not limited herein, as long as a linguistic characteristic of the user can be reflected.

The conditional probability model includes the at least one piece of candidate reply information and use frequency of each piece of candidate reply information in the at least one piece of candidate reply information. The use frequency may be frequency of using apiece of reply information in the reply information that is historically sent by the user. When the historically sent reply information is used as the candidate reply information, the use frequency of the historically sent reply information is also use frequency corresponding to the candidate reply information.

210. Perform, according to the conditional probability model, ranking for the first recommended reply information, the second recommended reply information, and the third recommended reply information, to obtain a set of recommended reply information.

The set of recommended reply information includes recommended reply information in at least one expression manner, so that the user selects and uses the recommended reply information to reply to the information to be replied to. The at least one expression manner may be expressions at different tone intensities for an expression with a same meaning.

Although there is only one set of recommended reply information, content of the set of recommended reply information may be varied, and may include the recommended reply information in at least one expression manner, for example, three, four, five, or seven expression manners; a specific type is not limited, and may be selected according to an actual situation.

Optionally, if the user does not send the pre-reply information that has been input, when the user changes the pre-reply information that has been input, the pre-reply information that has been input and changed by the user is acquired by referring to step 201, and then step 206 and subsequent steps are performed.

According to the reply information recommendation method provided in this embodiment of the present invention, a stored text interaction history set of a user can be learned to obtain a reply model; information to be replied to and pre-reply information that has been input by the user are acquired, and segmentation processing is performed on the information to be replied to; candidate reply information that can be input is obtained with reference to a segmentation processing result of the information to be replied to and the reply model; and a set of recommended reply information available for input is calculated with reference to the candidate reply information, the pre-reply information, and a stored individual language model, so that recommended reply information suitable for a context is quickly and accurately calculated when the user replies to information.

An embodiment of the present invention provides a reply information recommendation method, which is used in a scenario in which information to be replied to received by a user is a short message, and steps are as follows:

The user receives from a friend a short message "I will go to Haidilao with some friends tonight, would you come with us? You know all of them". This short message is information to be replied to received by the user, and "No" that is input by the user is pre-reply information that is input by the user and corresponding to the information to be replied to. The information to be replied to and the pre-reply information are acquired by referring to step 201, and by referring to step 202, segmentation processing is performed on the information to be replied to, to obtain a segmentation processing result. Specifically, the segmentation processing includes performing, according to a level of a character, a word, a phrase, or a sentence, segmentation on the information to be replied to, and keywords such as "tonight, Haidilao, with us, know" are obtained.

Referring to step 203, a stored text interaction history set of the user is learned to obtain a reply model, where the text interaction history set includes a reply pair of source information and reply information, that is, the text interaction history set includes at least one piece of historical information to be replied to that is historically received by the user and reply information corresponding to the at least one piece of historical information to be replied to, and the reply model includes at least one set of a correspondence between historical information to be replied to and reply information. The reply model may be learned and concluded from the text interaction history set.

Referring to step 204, candidate reply information is obtained with reference to the segmentation processing result of the information to be replied to and the reply model.

Specifically, the segmentation processing result and various combinations of the segmentation processing result may be used as segmented information to be replied to, the segmented information to be replied to is associated with information to be replied to that is historically received by the user in the reply model, and reply information that is historically sent by the user and corresponding to the information to be replied to that is historically received by the user is selected as the candidate reply information. The candidate reply information includes at least one of the following: a candidate character, a candidate word, a candidate phrase, and a candidate sentence. For example, a candidate sentence is "Sure, what time, "No, maybe next time", or the like.

A set of recommended reply information is calculated with reference to the candidate reply information and the pre-reply information. The recommended reply information includes at least one of the following: a recommended character, a recommended word, a recommended phrase, and a recommended sentence.

First referring to step 205, a multi-grammar information set is generated according to the candidate reply information for the information to be replied to.

The multi-grammar information set includes at least one piece of candidate reply information corresponding to the information to be replied to, and a priority of each piece of candidate reply information in the at least one piece of candidate reply information in being used as recommended reply information. The priority may be determined by an extent to which the candidate reply information and the information to be replied to are associated, and a higher extent indicates a higher priority. A specific characteristic that determines the priority is not limited herein.

Referring to step 206, the pre-reply information is combined with the multi-grammar information set to generate at least one piece of first recommended reply information, where the first recommended reply information includes at least one of the following: the recommended character and the recommended word.

Referring to step 207, semantic matching is performed between the pre-reply information and the candidate sentence to generate at least one piece of second recommended reply information, where the second recommended reply information includes at least one of the following: the recommended phrase and the recommended sentence.

Referring to step 208, fuzzy string matching is performed between the pre-reply information and the candidate sentence to generate at least one piece of third recommended reply information, where the third recommended reply information includes at least one of the following: the recommended phrase and the recommended sentence.

Referring to step 209, the conditional probability model is calculated according to the multi-grammar information set and a stored individual language model.

The individual language model includes a statistical result of reply information that is historically sent by the user, may include a statistical result of a linguistic habit in the reply information sent by the user, and may also include other information, which is not limited herein, as long as a linguistic characteristic of the user can be reflected.

The conditional probability model includes the at least one piece of candidate reply information and use frequency of each piece of candidate reply information in the at least one piece of candidate reply information. The use frequency may be frequency of using a piece of reply information in the reply information that is historically sent by the user. When the historically sent reply information is used as the candidate reply information, the use frequency of the historically sent reply information is also use frequency corresponding to the candidate reply information.

Then, referring to step 210, comprehensive ranking is performed, according to the conditional probability model, on the first recommended reply information, the second recommended reply information, and the third recommended reply information, to calculate the set of recommended reply information in three different expression manners shown is FIG. 3, that is, a radical expression manner, a moderate expression, and a conservative expression manner.

Radical:
1. I have many things to do these days. Maybe next time.
2. Sorry, I suffer from excessive internal heat these days.
3. I have something to do tonight, so I cannot go with you. Have fun.

Moderate:
1. I have to beg off. Maybe next time.
2. I have to beg off, because I have something to do tonight.
3. I have to work overtime today, so I have to beg off.
4. I have something to do tonight, so I have to beg off.

Conservative:
1. I beg off.
2. I have to beg off.

In practice, although there is only one set of recommended reply information, content of the set of recommended reply information may be varied, and may include the recommended reply information in at least one expression manner, for example, four, five, or seven expression manners, which is not limited to the foregoing three types; a specific type is not limited, and may be selected according to an actual situation.

The at least one expression manner may be expressions at different tone intensities for an expression with a same meaning.

In this way, recommended reply information suitable for a context can be quickly and accurately provided for the user to reply to the information to be replied to.

According to the reply information recommendation method provided in this embodiment of the present invention, a stored text interaction history set of a user can be learned to obtain a reply model; information to be replied to and pre-reply information that has been input by the user are acquired, and segmentation processing is performed on the information to be replied to; candidate reply information is obtained with reference to a segmentation processing result of the information to be replied to and the reply model; and a set of recommended reply information is calculated with reference to the candidate reply information, the pre-reply information, and a stored individual language model, so that recommended reply information suitable for a context can be quickly and accurately calculated when the user replies to information.

Figure 4:
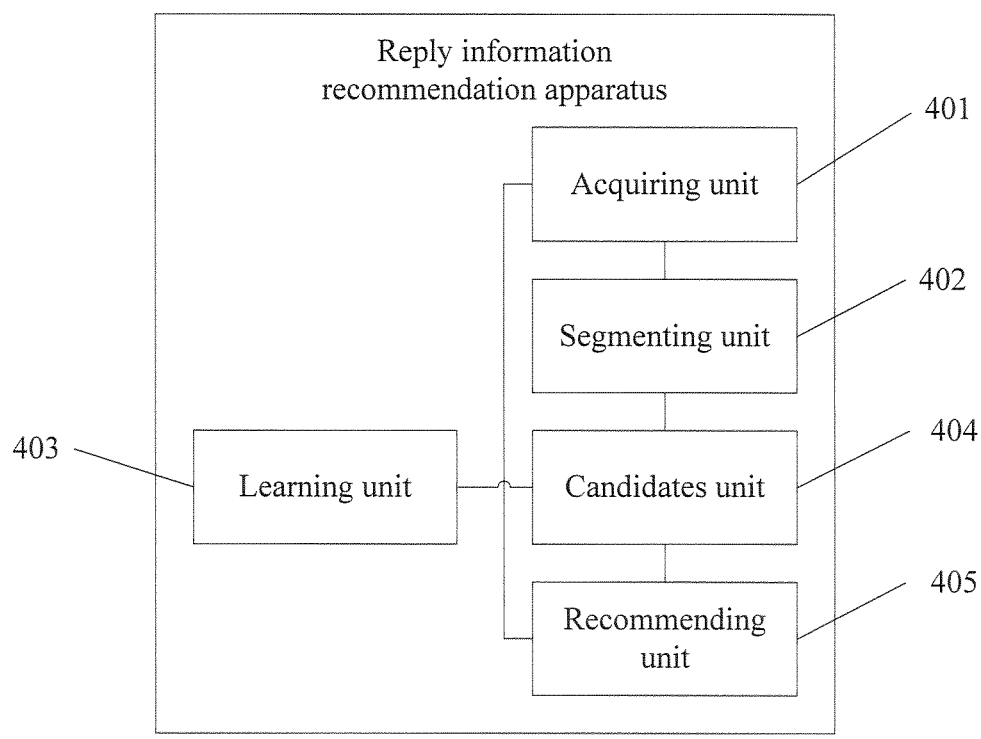
FIG. 4 is a schematic structural diagram of a reply information recommendation apparatus according to an embodiment of the present invention.

An embodiment of the present invention provides a reply information recommendation apparatus, which may be used to implement the foregoing reply information recommendation methods. Referring to FIG. 4, the reply information recommendation apparatus includes:

an acquiring unit 401, configured to acquire information to be replied to received by a user and pre-reply information that is input by the user and corresponding to the information to be replied to;

a segmenting unit 402, which may be configured to perform segmentation processing on the information to be replied to acquired by the acquiring unit 401, to obtain a segmentation processing result; where:

specifically and optionally, the segmenting unit 402 may be configured to perform, according to a level of a character, a word, a phrase, or a sentence, segmentation on the information to be replied to acquired by the acquiring unit 401, to obtain the segmentation processing result;

a learning unit 403, which may be configured to learn a text interaction history set that is of the user and stored in the reply information recommendation apparatus, to obtain a reply model, where the text interaction history set includes at least one piece of historical information to be replied to that is historically received by the user and reply information corresponding to the at least one piece of historical information to be replied to, and the reply model includes at least one set of a correspondence between historical information to be replied to and reply information;

a candidates unit 404, which may be configured to obtain candidate reply information with reference to the segmentation processing result that is of the information to be replied to and obtained by the segmenting unit 402 and the reply model learned by the learning unit 403; where:

specifically, the candidate reply information includes at least one of the following: a candidate character, a candidate word, a candidate phrase, and a candidate sentence; and a recommending unit 405, which may be configured to calculate a set of recommended reply information with reference to the candidate reply information obtained by the candidates unit 404 and the pre-reply information acquired by the acquiring unit 401.

Figure 5:
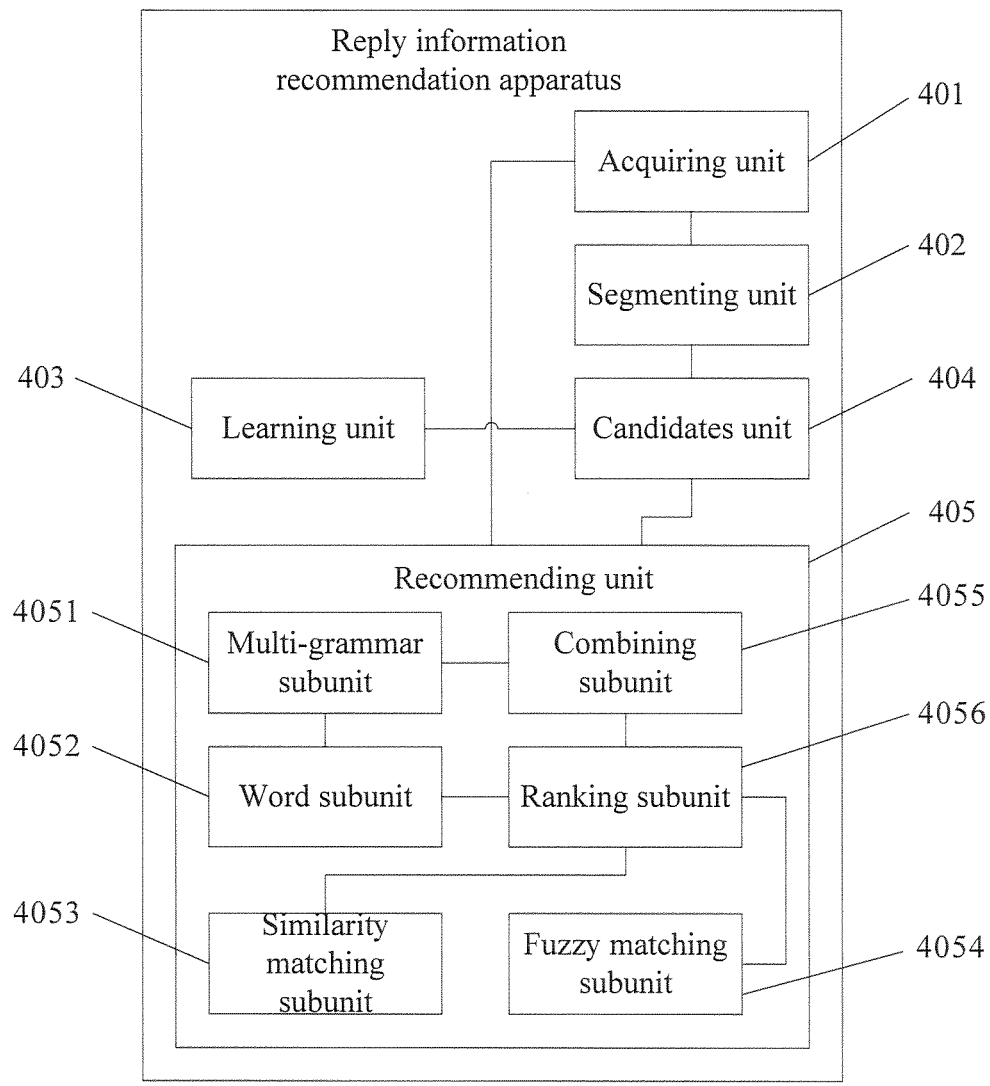
FIG. 5 is a schematic structural diagram of another reply information recommendation apparatus according to an embodiment of the present invention.

Optionally, referring to FIG. 5, the recommending unit 405 includes:

a multi-grammar subunit 4051, which may be configured to generate, according to the candidate reply information obtained by the candidates unit 404, a multi-grammar information set for the information to be replied to, where the multi-grammar information set includes at least one piece of candidate reply information corresponding to the information to be replied to, and a priority of each piece of candidate reply information in the at least one piece of candidate reply information in being used as recommended reply information;

a word subunit 4052, which may be configured to generate at least one piece of first recommended reply information with reference to the pre-reply information acquired by the acquiring unit 401 and the multi-grammar information set generated by the multi-grammar subunit 4051; where:

specifically, the first recommended reply information includes at least one of the following: a recommended character and a recommended word;

a similarity matching subunit 4053, which may be configured to perform semantic similarity matching between the pre-reply information acquired by the acquiring unit 401 and the candidate reply information obtained by the candidates unit 404, to generate at least one piece of second recommended reply information; where:

specifically, the similarity matching subunit 4053 may be configured to perform semantic similarity matching between the pre-reply information acquired by the acquiring unit 401 and the candidate reply information obtained by the candidates unit 404, to generate the at least one piece of second recommended reply information, where the second recommended reply information includes at least one of the following: a recommended phrase and a recommended sentence;

a fuzzy matching subunit 4054, which may be configured to perform fuzzy string matching between the pre-reply information acquired by the acquiring unit 401 and the candidate reply information obtained by the candidates unit 404, to generate at least one piece of third recommended reply information; where:

specifically, the fuzzy matching subunit 4054 may be configured to perform fuzzy matching between the pre-reply information acquired by the acquiring unit 401 and the candidate reply information obtained by the candidates unit 404, to generate the at least one piece of third recommended reply information, where the third recommended reply information includes at least one of the following: the recommended phrase and the recommended sentence;

a combining subunit 4055, which may be configured to calculate a conditional probability model according to the multi-grammar information set generated by the multi-grammar subunit 4051; where:

specifically, the combining subunit 4055 may be configured to calculate the conditional probability model according to the multi-grammar information set generated by the multi-grammar subunit 4051 and the stored individual language model, where the conditional probability model includes the at least one piece of candidate reply information and use frequency of each piece of candidate reply information in the at least one piece of candidate reply information, and the individual language model includes a statistical result of reply information that is historically sent by the user; and a ranking subunit 4056, which may be configured to perform, according to the conditional probability model generated by the combining subunit 4055, comprehensive ranking for the first recommended reply information generated by the word subunit 4052, the second recommended reply information generated by the similarity matching subunit 4053, and the third recommended reply information generated by the fuzzy matching subunit 4054, to obtain the set of recommended reply information, where the set of recommended reply information includes recommended reply information in at least one expression manner, so that the user selects and uses the recommended reply information to reply to the information to be replied to.

According to the reply information recommendation apparatus provided in this embodiment of the present invention, a stored text interaction history set of a user can be learned to obtain a reply model; information to be replied to and pre-reply information that has been input by the user are acquired, and segmentation processing is performed on the information to be replied to; candidate reply information is obtained with reference to a segmentation processing result of the information to be replied to and the reply model; and a set of recommended reply information is calculated with reference to the candidate reply information, the pre-reply information, and a stored individual language model, so that recommended reply information suitable for a context is quickly and accurately calculated when the user replies to information.

Figure 6:
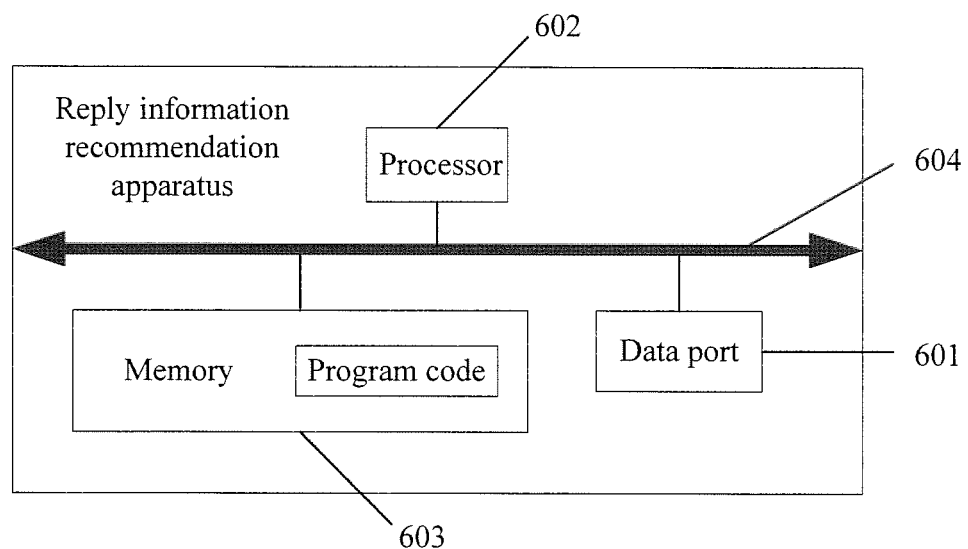
FIG. 6 is a schematic structural diagram of a reply information recommendation apparatus according to still another embodiment of the present invention.

Referring to FIG. 6, an embodiment of the present invention provides a reply information recommendation apparatus, which is used in the database field. The reply information recommendation apparatus includes a data port 601, a processor 602, a memory 603, and a bus 604, where the date port 601, the processor 602, and the memory 603 are connected by using the bus 604 to implement mutual communication, and the memory 603 stores program code executed by the processor 602.

The bus 604 may be an industry standard architecture (Industry Standard Architecture, ISA for short) bus, a peripheral component interconnect (Peripheral Component Interconnect, PCI for short) bus, an extended industry standard architecture (Extended Industry Standard Architecture, EISA for short) bus, or the like, which is not limited herein. The bus 604 may be categorized into an address bus, a data bus, a control bus, and the like. For ease of illustration, only one bold line is used in FIG. 6 to represent the bus, which, however, does not mean there is only one bus or only one type of bus.

The memory 603 is configured to store data or executable program code, where the program code includes a computer operation instruction, which may be specifically an operating system, an application, or the like. The memory 603 may include a high-speed RAM memory, and may further include a non-volatile memory (non-volatile memory), for example, at least one disk memory.

The processor 602 may be a central processing unit (Central Processing Unit, CPU for short), an application specific integrated circuit (Application Specific Integrated Circuit, ASIC for short), or one or more integrated circuits configured to implement the embodiments of the present invention.

The processor 602 is configured to implement data communication by executing the program code in the memory 603.

The data port 601 is configured to acquire information to be replied to received by a user and pre-reply information that is input by the user and corresponding to the information to be replied to; and the processor 602 is specifically configured to perform segmentation processing on the information to be replied to acquired by the data port 601, to obtain a segmentation processing result;

specifically, the processor 602 may be configured to perform, according to a level of a character, a word, a phrase, or a sentence, segmentation on the information to be replied to acquired by the data port 601, to obtain the segmentation processing result.

The processor 602 is further configured to learn a text interaction history set that is of the user and stored in the information processing apparatus, to obtain a reply model, where the text interaction history set includes at least one piece of historical information to be replied to that is historically received by the user and reply information corresponding to the at least one piece of historical information to be replied to, and the reply model includes at least one set of a correspondence between historical information to be replied to and reply information; and the processor 602 is further configured to obtain candidate reply information with reference to the segmentation processing result that is of the information to be replied to and obtained by the processor 602 and the reply model learned by the processor 602; where:

specifically, the candidate reply information includes at least one of the following: a candidate character, a candidate word, a candidate phrase, and a candidate sentence.

The processor 602 is further configured to calculate a set of recommended reply information with reference to the candidate reply information obtained by the processor 602 and the pre-reply information acquired by the data port 601.

Optionally, the processor 602 is specifically configured to generate, according to the candidate reply information obtained by the processor 602, a multi-grammar information set for the information to be replied to, where the multi-grammar information set includes at least one piece of candidate reply information corresponding to the information to be replied to, and a priority of each piece of candidate reply information in the at least one piece of candidate reply information in being used as recommended reply information;

the processor 602 is further configured to generate at least one piece of first recommended reply information with reference to the pre-reply information acquired by the data port 601 and the multi-grammar information set generated by the processor 602; where:

specifically, the first recommended reply information includes at least one of the following: a recommended character and a recommended word;

the processor 602 is further configured to perform semantic similarity matching between the pre-reply information acquired by the data port 601 and the candidate reply information obtained by the processor 602, to generate at least one piece of second recommended reply information;

specifically, the processor 602 is configured to perform semantic similarity matching between the pre-reply information acquired by the data port 601 and the candidate reply information obtained by the processor 602, to generate the at least one piece of second recommended reply information, where the second recommended reply information includes at least one of the following: a recommended phrase and a recommended sentence;

the processor 602 is further configured to perform fuzzy string matching between the pre-reply information acquired by the data port 601 and the candidate reply information obtained by the processor 602, to generate at least one piece of third recommended reply information;

specifically, the processor 602 is configured to perform fuzzy string matching between the pre-reply information acquired by the data port 601 and the candidate reply information obtained by the processor 602, to generate the at least one piece of third recommended reply information, where the third recommended reply information includes at least one of the following: the recommended phrase and the recommended sentence;

the processor 602 is further configured to calculate a conditional probability model according to the multi-grammar information set generated by the processor 602;

specifically, the processor 602 is configured to calculate the conditional probability model according to the multi-grammar information set generated by the processor 602 and a stored individual language model, where the conditional probability model includes the at least one piece of candidate reply information and use frequency of each piece of candidate reply information in the at least one piece of candidate reply information, and the individual language model includes a statistical result of reply information that is historically sent by the user; and the processor 602 is further configured to perform, according to the conditional probability model generated by the processor 602, comprehensive ranking for the first recommended reply information generated by the processor 602, the second recommended reply information generated by the processor 602, and the third recommended reply information generated by the processor 602, to obtain the set of recommended reply information, where the set of recommended reply information includes recommended reply information in at least one expression manner, so that the user selects and uses the recommended reply information to reply to the information to be replied to.

According to the reply information recommendation apparatus provided in this embodiment of the present invention, a stored text interaction history set of a user can be learned to obtain a reply model; information to be replied to and pre-reply information that has been input by the user are acquired, and segmentation processing is performed on the information to be replied to; candidate reply information is obtained with reference to a segmentation processing result of the information to be replied to and the reply model; and a set of recommended reply information is calculated with reference to the candidate reply information, the pre-reply information, and a stored individual language model, so that recommended reply information suitable for a context is quickly and accurately calculated when the user replies to information.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but shall not be construed as a limitation: The computer-readable medium may include a RAM (Random Access Memory, random access memory), a ROM (Read Only Memory, read-only memory), an EEPROM (Electrically Erasable Programmable Read Only Memory, electrically erasable programmable read-only memory), a CD-ROM (Compact Disc Read Only Memory, compact disc read-only memory), or another optical disc storage medium, another disk storage medium, or another magnetic storage device, or any other medium that can be used to carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a DSL (Digital Subscriber Line, digital subscriber line) or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk and a disc that are used in the present invention include a CD (Compact Disc, compact disc), a laser disc, an optical disc, a DVD (Digital Versatile Disc, digital versatile disc), a floppy disk, and a Blu-ray disc, where the disk generally copies data magnetically, and the disc optically copies data by using laser light. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A reply information recommendation method, comprising:
    acquiring information to be replied to and received by a user and pre-reply information that is input by the user and corresponding to the information to be replied to;
    performing segmentation processing on the information to be replied to, to obtain a segmentation processing result;
    learning a stored text interaction history set of the user to obtain a reply model, wherein the text interaction history set comprises at least one piece of historical information to be replied to that is historically received by the user and reply information corresponding to the at least one piece of historical information to be replied to, and the reply model comprises at least one set of a correspondence between historical information to be replied to and reply information;
    obtaining candidate reply information with reference to the segmentation processing result of the information to be replied to and the reply model;
    determining a set of recommended reply information with reference to the candidate reply information and the pre-reply information, wherein the set of recommended reply information comprises multiple expressions having different expression manners at different tone intensities, wherein the set of recommended reply information is determined using semantic matching and fuzzy string matching; and
    presenting the set of recommended reply information to the user for selection of at least one of the multiple expressions, wherein the set of recommended reply information is presented in an arrangement based on the different expression manners and a ranking of the recommended reply information.

2. The method according to claim 1, wherein performing segmentation processing on the information to be replied to, to obtain a segmentation processing result comprises:
    performing, according to a level of a character, a word, a phrase, or a sentence, segmentation on the information to be replied to, to obtain the segmentation processing result.

3. The method according to claim 1, wherein determining a set of recommended reply information with reference to the candidate reply information and the pre-reply information comprises:
    generating, according to the candidate reply information, a multi-grammar information set for the information to be replied to, wherein the multi-grammar information set comprises at least one piece of candidate reply information corresponding to the information to be replied to, and a priority of each piece of candidate reply information in the at least one piece of candidate reply information in being used as recommended reply information;
    combining the pre-reply information and the multi-grammar information set to generate at least one piece of first recommended reply information;
    performing semantic matching between the pre-reply information and the candidate reply information to generate at least one piece of second recommended reply information;
    performing fuzzy string matching between the pre-reply information and the candidate reply information to generate at least one piece of third recommended reply information;
    calculating a conditional probability model according to the multi-grammar information set, wherein the conditional probability model comprises the at least one piece of candidate reply information and use frequency of each piece of candidate reply information in the at least one piece of candidate reply information; and
    performing, according to the conditional probability model, comprehensive ranking for the first recommended reply information, the second recommended reply information, and the third recommended reply information, to obtain the set of recommended reply information.

4. The method according to claim 3, wherein calculating a conditional probability model according to the multi-grammar information set, wherein the conditional probability model comprises the at least one piece of candidate reply information and use frequency of each piece of candidate reply information in the at least one piece of candidate reply information comprises:
    calculating the conditional probability model according to the multi-grammar information set and a stored individual language model of the user, wherein the individual language model comprises a statistical result of reply information that is historically sent by the user.

5. The method according to claim 3, wherein the first recommended reply information comprises at least one of the following: a recommended character and a recommended word.

6. The method according to claim 3, wherein the second recommended reply information comprises at least one of the following: a recommended phrase and a recommended sentence.

7. The method according to claim 3, wherein the third recommended reply information comprises at least one of the following: a recommended phrase and a recommended sentence.

8. The method according to claim 1, wherein the candidate reply information comprises at least one of the following: a candidate character, a candidate word, a candidate phrase, and a candidate sentence.

9. The method according to claim 1, wherein the set of recommended reply information comprises at least one of the following: a recommended character, a recommended word, a recommended phrase, and a recommended sentence.

10. A reply information recommendation apparatus, comprising:
    a memory; and
    at least one processor configured to:
    acquire information to be replied to and received by a user and pre-reply information that is input by the user and corresponding to the information to be replied to;
    perform segmentation processing on the information to be replied to, to obtain a segmentation processing result;
    learn a stored text interaction history set of the user to obtain a reply model, wherein the text interaction history set comprises at least one piece of historical information to be replied to that is historically received by the user and reply information corresponding to the at least one piece of historical information to be replied to, and the reply model comprises at least one set of a correspondence between historical information to be replied to and reply information;

obtain candidate reply information with reference to the segmentation processing result that is of the information to be replied to and the reply model;

determine a set of recommended reply information with reference to the candidate reply information and the pre-reply information, wherein the set of recommended reply information comprises multiple expressions having different expression manners at different tone intensities, wherein the set of recommended reply information is determined using semantic matching and fuzzy string matching; and control the apparatus to present the set of recommended reply information to the user for selection of at least one of the multiple expressions, wherein the set of recommended reply information is presented in an arrangement based on the different expression manners and a ranking of the recommended reply information.

11. The apparatus according to claim 10, wherein the at least one processor is further configured to:

perform, according to a level of a character, a word, a phrase, or a sentence, segmentation on the information to be replied to, to obtain the segmentation processing result.

12. The apparatus according to claim 10, wherein the at least one processor is further configured to:

generate, according to the candidate reply information, a multi-grammar information set for the information to be replied to, wherein the multi-grammar information set comprises at least one piece of candidate reply information corresponding to the information to be replied to, and a priority of each piece of candidate reply information in the at least one piece of candidate reply information in being used as recommended reply information;

generate at least one piece of first recommended reply information with reference to the pre-reply information and the multi-grammar information set;

perform semantic similarity matching between the pre-reply information and the candidate reply information, to generate at least one piece of second recommended reply information;

perform fuzzy string matching between the pre-reply information and the candidate reply information, to generate at least one piece of third recommended reply information;

calculate a conditional probability model according to the multi-grammar information set, wherein the conditional probability model comprises the at least one piece of candidate reply information and use frequency of each piece of candidate reply information in the at least one piece of candidate reply information; and perform, according to the conditional probability model, comprehensive ranking for the first recommended reply information, the second recommended reply information, and the third recommended reply information, to obtain the set of recommended reply information.

13. The apparatus according to claim 12, wherein the at least one processor is further configured to:

calculate the conditional probability model according to the multi-grammar information set and a stored individual language model, wherein the individual language model comprises a statistical result of reply information that is historically sent by the user.

14. The apparatus according to claim 12, wherein the first recommended reply information comprises at least one of the following: a recommended character and a recommended word.

15. The apparatus according to claim 12, wherein the second recommended reply information comprises at least one of the following: a recommended phrase and a recommended sentence.

16. The apparatus according to claim 12, wherein the third recommended reply information comprises at least one of the following: a recommended phrase and a recommended sentence.

17. The apparatus according to claim 10, wherein the candidate reply information comprises at least one of the following: a candidate character, a candidate word, a candidate phrase, and a candidate sentence.

18. The apparatus according to claim 10, wherein the set of recommended reply information comprises at least one of the following: a recommended character, a recommended word, a recommended phrase, and a recommended sentence.

* * * * *